United States Patent
Schafer et al.

(10) Patent No.: US 9,175,449 B2
(45) Date of Patent: Nov. 3, 2015

(54) TRANSMISSION SYSTEM FOR TRANSMITTING POWER FROM ENGINE TO MILLING ROTOR IN COLD PLANER

(71) Applicant: Caterpillar Paving Products Inc., Minneapolis, MN (US)

(72) Inventors: Benjamin Thomas Schafer, Elk River, MN (US); Jason Robert Bjorge, Blaine, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 23 days.

(21) Appl. No.: 13/798,579

(22) Filed: Mar. 13, 2013

(65) Prior Publication Data
US 2014/0265525 A1   Sep. 18, 2014

(51) Int. Cl.
*E01C 23/088* (2006.01)
*F16H 7/08* (2006.01)

(52) U.S. Cl.
CPC ....... *E01C 23/088* (2013.01); *F16H 2007/0893* (2013.01)

(58) Field of Classification Search
USPC ......... 404/90, 93, 94; 299/39.1, 39.4; 477/44; 474/134, 135
See application file for complete search history.

(56) References Cited

U.S. PATENT DOCUMENTS

| 1,387,445 | A | * | 8/1921 | Anderson | ...... 474/133 |
| 4,193,636 | A | | 3/1980 | Jakob | |
| 4,256,344 | A | * | 3/1981 | Hatcher | ...... 299/39.4 |
| 4,881,926 | A | | 11/1989 | Aoki et al. | |
| 4,929,121 | A | | 5/1990 | Lent et al. | |
| 2007/0191179 | A1 | * | 8/2007 | Hugenroth et al. | ...... 477/2 |
| 2008/0260461 | A1 | | 10/2008 | Berning et al. | |
| 2009/0051210 | A1 | * | 2/2009 | Busley et al. | ...... 299/39.4 |
| 2011/0227393 | A1 | | 9/2011 | Berning et al. | |

FOREIGN PATENT DOCUMENTS

| CN | 201422266 | | 3/2010 |
| DE | 102005028091 | A1 * | 12/2006 |
| GB | 2449916 | | 12/2008 |
| KR | 1020110012166 | | 2/2011 |
| KR | 101109685 | | 2/2012 |

* cited by examiner

*Primary Examiner* — Sunil Singh
(74) *Attorney, Agent, or Firm* — Baker & Hostetler LLP

(57) ABSTRACT

A transmission system is provided for transmitting power from an engine to a milling rotor in a cold planer. The transmission system includes a first circuit, a second circuit, and a shaft. The first circuit is disposed in a first plane and configured to be operatively driven by the engine. The second circuit is disposed in a second plane substantially parallel to the first plane and configured to operatively drive the milling rotor. The shaft couples the first circuit to the second circuit wherein the engine and the milling rotor are axially offset.

8 Claims, 2 Drawing Sheets

TRANSMISSION SYSTEM FOR TRANSMITTING POWER FROM ENGINE TO MILLING ROTOR IN COLD PLANER

TECHNICAL FIELD

The present disclosure relates to a transmission system and, more particularly, to a transmission system for transmitting power from an engine to a milling rotor in a cold planer.

BACKGROUND

Cold planers are machines used during paving operations to remove a layer of material, such as asphalt, off the ground surface with its milling rotor. A cold planer typically has a transmission system that couples an engine to a milling rotor.

In some cases, cold planers may offer limited spaces for installation of transmission systems. The limited space poses tight space constraints during an installation of the transmission system, thus making the transmission system difficult to connect at positions of the engine and the milling rotor. For example, space constraints may require the gearing for the engine and the milling rotor to be disposed in non-coaxial and non-coplanar relation to each other. Thus, large-scale manufacturers of construction machinery, such as cold planers, may sometimes find themselves in situations where the transmission systems are difficult to install due to the tight space constraints. This situation makes installation of the transmission systems complex. Alternatively, it can be difficult to install a rotor onto the transmission system when the manufacturer or customer desires to couple milling rotors of different widths to an existing engine.

One way known to deal with this situation is to install gearing boxes within the transmission system. However, these gearing boxes are bulky and lose power during the transmission from the engine to the milling rotor. The transmission losses subsequently affect the overall productivity of the cold planer. Further, these gearing boxes experience overheating during operation thus requiring cooling systems to keep the transmission system from overheating. Typical cooling systems include pumps, compressors, and cooling lines, and installation and operation of these cooling systems may incur additional expenses. Typical transmission systems are also heavy and difficult to transport from one place to another along with the associated cooling systems.

In order to mitigate the aforesaid situations, manufacturers may redesign various parameters of the machine in order to accommodate different rotor sizes. Conversely, the manufacturers may produce altogether different machines that individually cater to specific size requirements of the milling rotor. However, the aforesaid processes may be expensive and time consuming.

GB Patent 2 449 916 relates to a variable ratio belt drive comprising a first belt, a compound double pulley having a first variable diameter pulley engaged by the first belt and a second variable diameter pulley engaged by a second drive belt. The compound double pulley is arranged such that increases in an effective diameter of one pulley produce corresponding reductions in effective diameter of the other pulley. The belt drive further comprises a third spring-loaded variable diameter pulley which also engages the second drive belt, and a control actuator for varying the effective diameters of the first and second drive pulleys thus varying an overall ratio of the belt drive. Although the variable ratio belt drive accounts for an axial offset between a load and a prime mover, it does not account for cases where an axial and planar offset exists between the load and the prime mover.

SUMMARY

In one aspect of the present disclosure, a transmission system is provided for transmitting power from an engine to a milling rotor in a cold planer. The transmission system includes a first circuit, a second circuit, and a shaft. The first circuit is disposed in a first plane and configured to be operatively driven by the engine. The second circuit is disposed in a second plane substantially parallel to the first plane and configured to operatively drive the milling rotor. The shaft couples the first circuit to the second circuit wherein the engine and the milling rotor are axially offset.

In another aspect, the present disclosure provides a cold planer comprising an engine, a milling rotor, and a transmission system. The transmission system includes a first circuit, a second circuit, and a shaft. The first circuit is disposed in a first plane and configured to be operatively driven by the engine. The second circuit is disposed in a second plane substantially parallel to the first plane and configured to operatively drive the milling rotor. The shaft couples the first circuit to the second circuit wherein the engine and the milling rotor are axially offset.

In another aspect, the present disclosure provides a cold planer including an engine, a milling rotor, a means for transmitting energy from the engine located within a first plane, a means for transmitting energy to the milling rotor located within a second plane, and a means for transferring the energy from the means for transmitting energy from the engine to the means for transmitting energy to the milling rotor, wherein the first plane and the second plane are substantially parallel, wherein the engine and milling rotor are axially offset from each other.

Other features and aspects of this disclosure will be apparent from the following description and the accompanying drawings.

DETAILED DESCRIPTION

Figure 1:
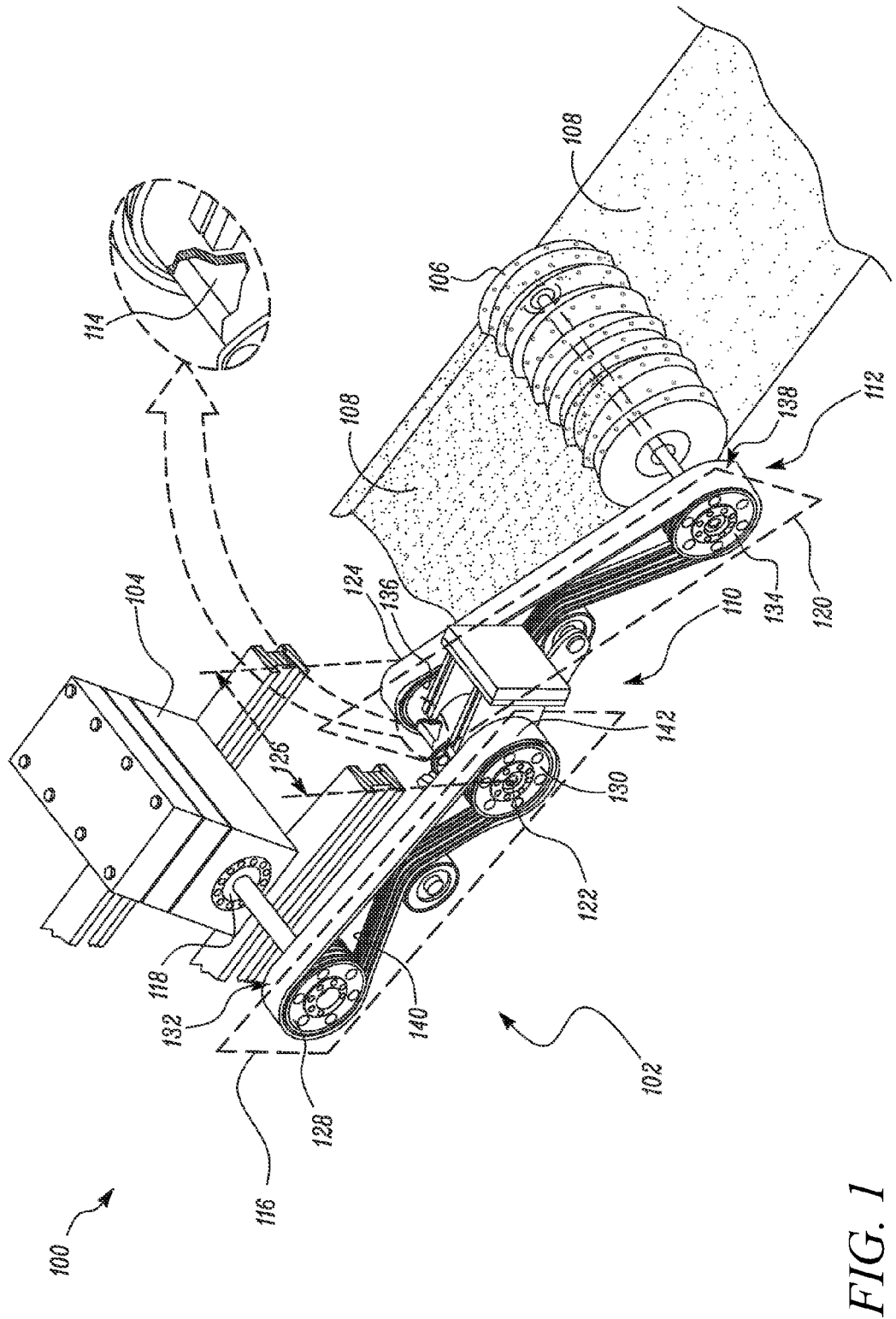
FIG. 1 is a front breakaway perspective view of a machine employing a transmission system in accordance with an embodiment of the present disclosure.

The present disclosure relates to a transmission system for transmitting power from a prime mover to a load in a machine, and more particularly, from an engine to a milling rotor of a cold planer. FIG. 1 shows a front perspective view of a machine 100 employing a transmission system 102 in which disclosed embodiments may be implemented. In the embodiment shown in FIG. 1, the machine 100 is a cold planer. In alternative embodiments, the machine 100 may also be a variety of other machines, including rock crushers, compactors, or rotary mixers.

The machine 100 includes an engine 104, and a milling rotor 106. The engine 104 is configured to drive the milling rotor 106. The milling rotor 106 is configured to remove a layer off the ground surface 108. Typically, the layer is asphalt and the milling rotor 106 is configured to remove asphalt to a pre-determined depth. Although reference has been made to the engine 104 and the milling rotor 106 in conjunction with the cold planer herein, it is to be noted that the engine 104 and the milling rotor 106 is merely exemplary in nature and hence, non-limiting of this disclosure. Hence, any type of prime mover commonly known in the art, such as an electric motor, may be used in place of the engine 104 and any type of load may be driven by the prime mover depending on a type of the machine 100 and its application. Some commonly known loads in the field of construction machinery include compactor drums, belt or chain driven compressors, pump, and the like.

Figure 2:
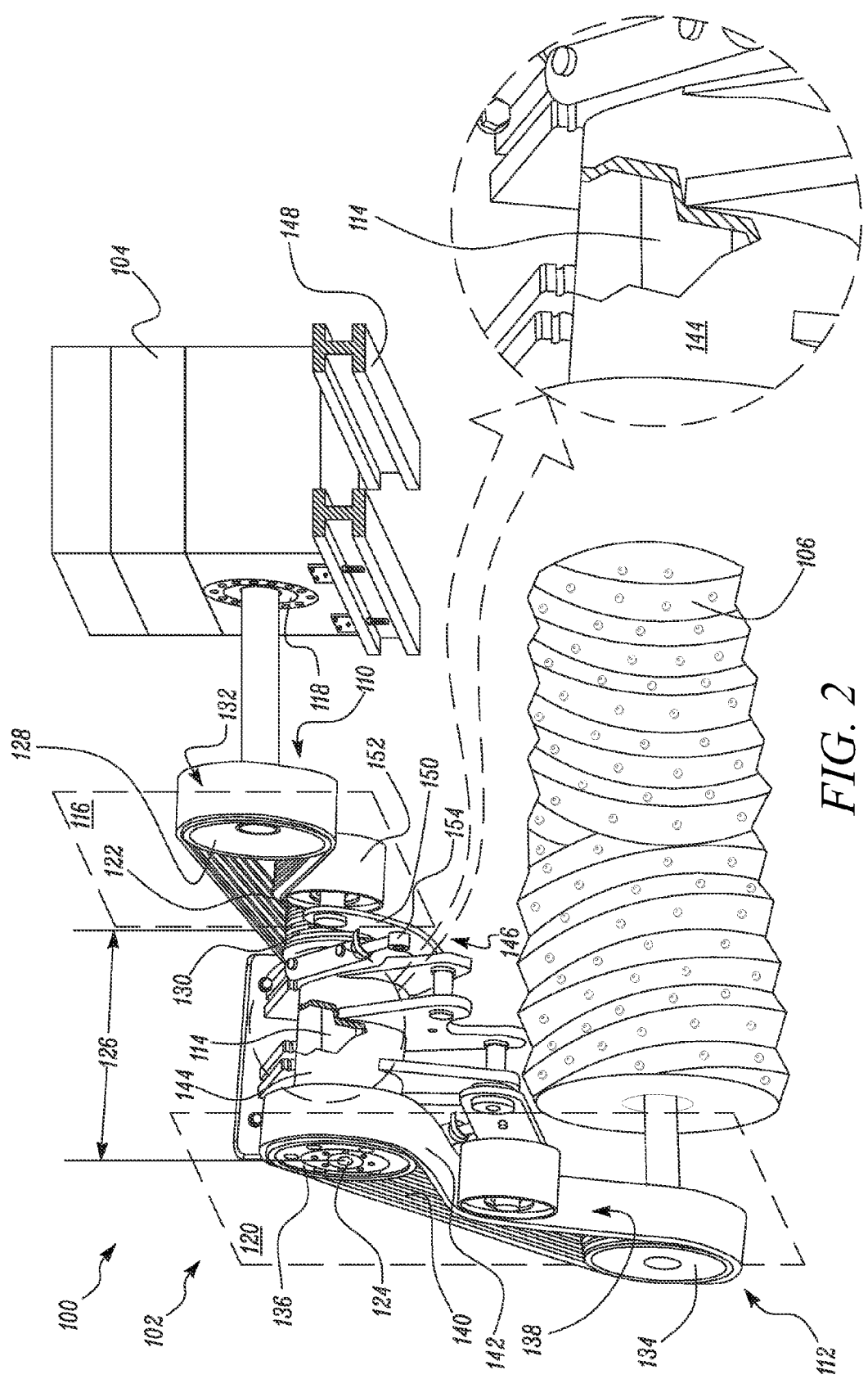
FIG. 2 is a side breakaway perspective view of the transmission system.

As shown in FIG. 1, the transmission system 102 includes a first circuit 110, a second circuit 112, and a shaft 114. The first circuit 110 is disposed in a first plane 116 and configured to be operatively driven by the engine 104. In an embodiment as shown in FIG. 2, the transmission system 102 further includes a clutch assembly 118 connected to the engine 104. The clutch assembly 118 is configured to selectively engage the milling rotor 106 to the engine 104. In one embodiment, the clutch assembly 118 may engage the milling rotor 106 to the engine 104 such that the milling rotor 106 is driven by the engine 104. In another embodiment, the clutch assembly 118 may disengage the milling rotor 106 from the engine 104 such that the milling rotor 106 is allowed to free-wheel with respect to the engine 104. The clutch assembly 118 disclosed herein may be actuated using commonly known implements such as levers or control buttons (not shown) such that power is selectively transferred from the engine 104 to the milling rotor 106 via the transmission system 102.

The second circuit 112 is disposed in a second plane 120 substantially parallel to the first plane 116. The second circuit is configured to operatively drive the milling rotor 106. The shaft 114 couples the first circuit 110 to the second circuit 112 wherein the engine 104 and the milling rotor 106 are axially offset.

In an embodiment as shown in FIG. 1, the shaft 114 may include a first end 122 and a second end 124. The first end 122 supports the first circuit 110 at the first plane 116, and the second end 124 supports the second circuit 112 at the second plane 120. The first and the second ends 122, 124 of the shaft 114 are distally located from each other by virtue of a length 126 of the shaft 114. Therefore, the circuits 110, 112 supported at the ends 122, 124 subsequently become distally located into respective planes 116, 120 of the engine 104 and the milling rotor 106.

In an embodiment as shown in FIGS. 1-2, the first circuit 110 includes a drive pulley 128, a first pulley 130, and a first belt 132. The drive pulley 128 is configured to be engaged with the engine. The first pulley 130 is coupled to the first end 122 of the shaft 114. The first belt 132 is looped over the first pulley 130, and the drive pulley 128. Similarly, in an embodiment as shown in FIGS. 1-2, the second circuit 112 includes a driven pulley 134, a second pulley 136, and a second belt 138. The driven pulley 134 is configured to be engaged with the milling rotor 106. The second pulley 136 is coupled to the second end 124 of the shaft 114. The second belt 138 is looped over the second pulley 136, and the driven pulley 134.

In one embodiment, a diameter of the drive pulley 128, the driven pulley 134, the first pulley 130, and the second pulley 136 may be substantially same. Consequently, a speed ratio of the drive pulley 128 to the driven pulley 134 is substantially 1:1. In other embodiments, the speed ratio of the drive pulley 128 to the driven pulley 134 may be varied by changing the diameters of one or more of the drive pulley 128, the driven pulley 134, the first pulley 130, and the second pulley 136 relative to each other. Therefore, in these other embodiments, the speed ratio of the drive pulley 128 to the driven pulley 134 may a reduction or overdrive speed ratio. The reduction speed ratio is a ratio of the drive pulley 128 to the driven pulley 134 less than 1:1, for example, 1:0.5 while an overdrive speed ratio is a ratio of the drive pulley 128 to the driven pulley 134 more than 1:1, for example, 1:1.5.

In one embodiment, the first and second pulleys 130, 136 may be of a multi-groove type. Correspondingly, the first and second belts 132, 138 are multi-grooved v-belts and include a grooved side 140 and a flat side 142. The grooved side 140 is configured to engage with the multi-groove profile of the first and second pulleys 130, 136. A person having ordinary skill in the art may acknowledge that a profile on the grooved side 140 of the first and second belts 132, 138 is a conjugate of a profile on the pulleys 130, 136. Similarly, in alternative embodiments, the first and second pulleys 130, 136 may exhibit a flat profile, an arcuate profile, a ribbed profile, or a toothed profile while a suitable conjugate profile may be chosen on the belts 132, 138 such that the belts 132, 138 and the pulleys 128, 130, 134, and 136 grip each other, and rotate in unison upon looping.

In one embodiment as shown in FIG. 2, the transmission system 102 further includes a housing 144, and one or more tensioning assemblies 146 disposed on the housing 144. The housing 144 is releasably connected to a frame 148 of the machine 100 and is configured to rotatably support the shaft 114. The tensioning assemblies 146 are configured to adjust a tension within the belts 132, 138.

The tensioning assembly 146 includes an arm 150, a tensioner pulley 152, and a hydraulic actuator 154. The arm 150 is swingably connected to the housing 144. The tensioner pulley 152 is rotatably mounted on the arm 150 and disposed in rolling contact with the first belt 132 or the second belt 138. The hydraulic actuator 154 is disposed between the housing 144 and the arm 150. The hydraulic actuator 154 is configured to extend or retract the tensioner pulley 152 into the first or the second belt 132, 138, such that tension within the associated belt 132, 138 is adjusted. The housing 144 and the tensioning assemblies 146 allow adjustment of belts 132, 138 should belts 132, 138 shift or loosen during operation of the machine 100. The housing 144 and the tensioning assemblies 146 also allow the replacement of the belts 132, 138 should they become damaged or broken during operation of the machine 100.

Although, reference has been made to a transmission system 102 employing belts 132, 138 and pulleys 128, 130, 134, and 136 it is to be noted that the belts 132, 138 and pulleys 128, 130, 134, and 136 are merely exemplary in nature and hence, non-limiting of this disclosure. A person having ordinary skill in the art will acknowledge that parts of the transmission system 102 disclosed herein may change based on a type of drive system used, for example, a belt drive system or a chain drive system. Instead of belts and pulleys, gearing of different sizes may be used. Additionally, electric, hydrostatic, and hydrodynamic transmission systems are contemplated by the present disclosure.

INDUSTRIAL APPLICABILITY

Typical transmission systems implemented in construction machines, such as cold planers, may include gear boxes coupled to an engine and a milling rotor of the cold planer. However, in some cases, construction machines may offer limited spaces for installation of the transmission systems. The limited space poses tight space constraints during an installation of the transmission system thus making the transmission system difficult to connect at positions of the engine and the milling rotor.

However, the transmission system 102 of the present disclosure may be installed in spaces having tight space constraints, and also in situations where the engine 104 and the milling rotor 106 are disposed in non-coaxial and non-coplanar relation to each other. The housing 144 of the transmission system 102 is releasably connected to the frame 148 of the machine 100 and hence may be easily disconnected during a service or overhaul routine. Further, a length 126 of the shaft 114 may be varied to suit an axial offset between the engine 104 and the milling rotor 106.

Further, typical transmission systems previously constructed for use in cold planers were expensive to manufacture, install, and operate. Gears present within the transmission systems were sometimes bulky, and caused power losses within the transmission system. However, the transmission system 102 of the present disclosure may mitigate exorbitant costs that were previously incurred with the manufacture, installation, and operation of the typical transmission systems. Further, implementation of the present transmission system 102 may allow a manufacturer to do away with modifying the machine 100 altogether or installing bulky gearing boxes since the transmission system 102 may be manufactured taking into account specific space constraints, and the specific offsets of the engine 104 and the milling rotor 106.

Further, bulky gears of the previous transmission systems also experience overheating during operation thus requiring auxiliary cooling systems to cool down the transmission system. These auxiliary cooling systems incur additional operational costs and hence, may increase the overall costs of operating the typical transmission systems. Subsequently, the additional costs may negatively impact the overall productivity of the machine.

In the transmission system 102 of the present disclosure, cooling may be achieved by a natural convection of heat to surrounding air, or by a draft of air forced by the first and the second belts 132, 138 upon rotation. Therefore, implementation of such transmission systems 102 may further mitigate or reduce exorbitant costs previously incurred with the inclusion of cooling systems.

Further, bulky gearing boxes of the typical transmission systems often increased a weight of the transmission system thus making transportation of such systems difficult. However, the transmission system 102 of the present disclosure is light weight, compact and hence easy to transport.

While aspects of the present disclosure have been particularly shown and described with reference to the embodiments above, it will be understood by those skilled in the art that various additional embodiments may be contemplated by the modification of the disclosed machine, systems and methods without departing from the spirit and scope of what is disclosed. Such embodiments should be understood to fall within the scope of the present disclosure as determined based upon the claims and any equivalents thereof.

We claim:

1. A transmission system for transmitting power from an engine to a milling rotor in a cold planer, the transmission system comprising:
   a first circuit arranged in a first plane and configured to be operatively driven by the engine, the first circuit comprising a drive pulley having a first drive belt configured to be engaged with the engine, a first pulley coupled to a first end of a shaft and configured to be driven by the drive pulley;
   a second circuit arranged in a second plane substantially parallel to the first plane and configured to be operatively driven by the first circuit through the shaft and to operatively drive the milling rotor, the second circuit comprising a driven pulley having a second drive belt configured to be engaged with the milling rotor, a second pulley coupled to a second end of the shaft and configured to drive the driven pulley;
   the shaft coupling the first circuit to the first shaft end, the second circuit to the second shaft end, and the first circuit to the second circuit, wherein the first shaft end supports the first circuit and wherein the second shaft end supports the second circuit;
   a housing arranged in between the first circuit and the second circuit, the housing configured to rotatably support the shaft;
   a first tensioning assembly arranged on the housing, the first tensioning assembly configured to adjust a tension of the first drive belt, and the first tensioning assembly comprising a first arm swingably connected to the housing, a first tensioner pulley rotatably mounted on the first arm and arranged in rolling contact with the first drive belt, and a first hydraulic actuator arranged between the housing and the first arm, the first hydraulic actuator configured to extend or retract the first tensioner pulley into the first drive belt; and
   a second tensioning assembly arranged on the housing, the second tensioning assembly configured to adjust a tension of the second drive belt,
   wherein the engine and the milling rotor are axially offset.

2. The transmission system of claim 1, wherein the second tensioning assembly comprises:
   a second arm swingably connected to the housing;
   a second tensioner pulley rotatably mounted on the second arm and arranged in rolling contact with the second drive belt; and
   a second hydraulic actuator arranged between the housing and the second arm, the second hydraulic actuator configured to extend or retract the second tensioner pulley into the second drive belt.

3. A cold planer comprising:
   an engine and a milling rotor, wherein the engine and the milling rotor are axially offset, and a transmission system comprising:
   a first circuit arranged in a first plane and configured to be operatively driven by the engine, the first circuit comprising a drive pulley having a first drive belt configured to be engaged with the engine, a first pulley coupled to a first end of a shaft and configured to be driven by the drive pulley;
   a second circuit arranged in a second plane substantially parallel to the first plane and configured to operatively drive the milling rotor, and axially offset with respect to the first plane, the second circuit configured to be operatively driven through the shaft by the first circuit and to operatively drive the milling rotor, the second circuit comprising a driven pulley having a second drive belt configured to be engaged with the milling rotor, a second pulley coupled to a second end of the shaft and configured to drive the driven pulley;
   the shaft coupling the first circuit to the first shaft end, the second circuit to the second shaft end, and the first circuit to the second circuit, wherein the first shaft end supports the first circuit and wherein the second shaft end supports the second circuit;
   a housing arranged in between the first circuit and the second circuit, the housing configured to rotatably support the shaft;
   a first tensioning assembly arranged on the housing, the first tensioning assembly configured to adjust a tension of the first drive belt, and the first tensioning assembly comprising a first arm swingable connected to the housing, a first tensioner pulley rotatably mounted on the first arm and arranged in rolling contact with the first drive belt, and a first hydraulic actuator arranged between the housing and the first arm, the first hydraulic actuator configured to extend or retract the first tensioner pulley into the first drive belt; and a second tensioning assembly arranged on the housing, the second tensioning assembly configured to adjust a tension of the second drive belt.

4. The cold planer of claim 3, further comprising a clutch assembly connected to the engine and configured to selectively engage the milling rotor to the engine.

5. The cold planer of claim 3, wherein the second tensioning assembly comprises:
   a second arm swingably connected to the housing;
   a second tensioner pulley rotatably mounted on the second arm and arranged in rolling contact with the second drive belt; and
   a second hydraulic actuator arranged between the housing and the second arm, the second hydraulic actuator configured to extend or retract the second tensioner pulley into the second drive belt.

6. A transmission system for transmitting power from an engine to a milling rotor in a cold planer, the transmission system comprising:
   a first circuit arranged in a first plane and configured to be operatively driven by the engine, the first circuit comprising a drive pulley having a first drive belt configured to be engaged with the engine, a first pulley coupled to a first end of a shaft and configured to be driven by the drive pulley;
   a second circuit arranged in a second plane substantially parallel to the first plane and configured to be operatively driven by the first circuit through the shaft and to operatively drive the milling rotor, the second circuit comprising a driven pulley having a second drive belt configured to be engaged with the milling rotor, a second pulley coupled to a second end of the shaft and configured to drive the driven pulley;
   the shaft coupling the first circuit to the first shaft end, the second circuit to the second shaft end, and the first circuit to the second circuit, wherein the first shaft end supports the first circuit and wherein the second shaft end supports the second circuit;
   a housing arranged in between the first circuit and the second circuit, the housing configured to rotatably support the shaft;
   a first tensioning assembly arranged on the housing, the first tensioning assembly configured to adjust a tension of the first drive belt; and
   a second tensioning assembly arranged on the housing, the second tensioning assembly configured to adjust a tension of the second drive belt,
      wherein the first tensioning assembly comprises a first roller configured to engage the first drive belt and the second tensioning assembly comprises a second roller configured to engage the second drive belt, and
   wherein the engine and the milling rotor are axially offset.

7. A cold planer comprising:
   an engine and a milling rotor, wherein the engine and the milling rotor are axially offset, and a transmission system comprising:
      a first circuit arranged in a first plane and configured to be operatively driven by the engine, the first circuit comprising a drive pulley having a first drive belt configured to be engaged with the engine, a first pulley coupled to a first end of a shaft and configured to be driven by the drive pulley;
      a second circuit arranged in a second plane substantially parallel to the first plane and configured to operatively drive the milling rotor, and axially offset with respect to the first plane, the second circuit configured to be operatively driven through the shaft by the first circuit and to operatively drive the milling rotor, the second circuit comprising a driven pulley having a second drive belt configured to be engaged with the milling rotor, a second pulley coupled to a second end of the shaft and configured to drive the driven pulley;
      the shaft coupling the first circuit to the first shaft end, the second circuit to the second shaft end, and the first circuit to the second circuit, wherein the first shaft end supports the first circuit and wherein the second shaft end supports the second circuit;
      a housing arranged in between the first circuit and the second circuit, the housing configured to rotatably support the shaft;
      a first tensioning assembly arranged on the housing, the first tensioning assembly configured to adjust a tension of the first drive belt; and
      a second tensioning assembly arranged on the housing, the second tensioning assembly configured to adjust a tension of the second drive belt,
         wherein the first tensioning assembly comprises a first roller configured to engage the first drive belt and the second tensioning assembly comprises a second roller configured to engage the second drive belt.

8. A cold planer, the cold planer comprising:
an engine;
a milling rotor;
means for transmitting energy from the engine;
means for transmitting energy to the milling rotor; and
means for transferring the energy from the means for transmitting energy from the engine to the means for transmitting energy to the milling rotor;
   wherein the means for transmitting energy from the engine is located within a first plane;
   wherein the means for transmitting energy to the milling rotor is located in a second plane;
   wherein the means for transferring the energy from the means for transmitting energy from the engine to the means to the means for transmitting energy to the milling rotor comprises a means for coupling a first end of a shaft supporting the means for transmitting energy from the engine and coupling a second end of the shaft supporting the means for transmitting energy to the milling rotor;
   wherein the first plane and the second plane are substantially parallel;
   wherein the engine and milling rotor are axially offset from each other;
   wherein the shaft includes a housing arranged in between the first plane and the second plane, the housing configured to rotatably support the shaft
   wherein the housing includes a first tensioning assembly and a second tensioning assembly arranged on the housing, the first tensioning assembly configured to adjust a tension of a first drive belt of the means for transmitting energy from the engine and the second tensioning assembly configured to adjust a tension of a second drive belt of the means for transmitting energy to the milling rotor, and wherein the first tensioning assembly comprises a first roller configured to engage the first drive belt and the second tensioning assembly comprises a second roller configured to engage the second drive belt.

* * * * *